US010204635B1

(12) United States Patent
Zhou et al.

(10) Patent No.: US 10,204,635 B1
(45) Date of Patent: Feb. 12, 2019

(54) DEVICE AND METHOD FOR PROCESSING MEDIA SAMPLES

(71) Applicant: Marvell International Ltd., Hamilton (BM)

(72) Inventors: Gongyu Zhou, Santa Clara, CA (US); Dehuan Meng, Beijing (CN); Donald Pannel, Cupertino, CA (US); Fei Wu, Beijing (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 43 days.

(21) Appl. No.: 15/366,902

(22) Filed: Dec. 1, 2016

Related U.S. Application Data (60) Provisional application No. 62/261,649, filed on Dec. 1, 2015.

(51) Int. Cl.
*G10L 19/00* (2013.01)
*G10L 19/16* (2013.01)
*G10L 19/24* (2013.01)

(52) U.S. Cl.
CPC ............ *G10L 19/167* (2013.01); *G10L 19/24* (2013.01)

(58) Field of Classification Search
USPC .................................. 704/200–232, 500–504
See application file for complete search history.

(56) References Cited

U.S. PATENT DOCUMENTS

| 2005/0058145 | A1* | 3/2005 | Florencio | G10L 19/005 |
| | | | | 370/412 |
| 2006/0045138 | A1* | 3/2006 | Black | G10L 19/005 |
| | | | | 370/516 |
| 2007/0168188 | A1* | 7/2007 | Choi | G10L 21/04 |
| | | | | 704/211 |
| 2009/0070119 | A1* | 3/2009 | Yoo | G06F 1/3203 |
| | | | | 704/500 |
| 2010/0265398 | A1* | 10/2010 | Johnson | H04H 20/30 |
| | | | | 348/500 |
| 2015/0206542 | A1* | 7/2015 | Gilson | G10L 19/012 |
| | | | | 704/226 |

* cited by examiner

*Primary Examiner* — Jesse S Pullias (57) ABSTRACT

Aspects of the disclosure include a device for processing media samples. The device includes a frame decoder, a buffer, and a placement manager. The frame decoder is configured to receive a data frame from a source outside the device, extract from the data frame a first sample, and determine a first designated playback time of the first sample. The buffer has memory portions, and addresses of the memory portions are associated with a reference time and time increments of a local sampling period of the device. The placement manager is configured to store the first sample in a first memory portion of the buffer having a first address that is associated with a first time increment that most closely corresponds to the first designated playback time of the first sample.

17 Claims, 7 Drawing Sheets

FIG. 7

DEVICE AND METHOD FOR PROCESSING MEDIA SAMPLES

INCORPORATION BY REFERENCE

This present disclosure claims the benefit of U.S. Provisional Application No. 62/261,649, "Method and Device for Regulating Local Medium Playing Speed" filed on Dec. 1, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In some entertainment systems, media signals, such as audio signals, may be transmitted in an analog format from a source device, such as a recording device or a storage device, to a destination device, such as a playback device, through plural conductive cables. In order to reduce the transmission loss and signal distortion, these conductive cables often have relatively large cross-sections and robust shielding and insulation. As a result, these conductive cables for entertainment systems can be expensive and bulky. In some other entertainment systems, the bulky cables may be replaced by a data network, where the media signals are transmitted as digital data streams through the data network. When the data network is implemented according to the Ethernet protocol and the media data corresponds to audio samples, such transmission technology is also referred to as Audio over Ethernet (AoE).

SUMMARY

Aspects of the disclosure provide a device for processing media samples. The device includes a frame decoder, a buffer, and a placement manager. The frame decoder is configured to receive a data frame from a source outside the device, extract from the data frame a first sample, and determine a first designated playback time of the first sample. The buffer has memory portions, and addresses of the memory portions are associated with a reference time and time increments of a local sampling period of the device. The placement manager is configured to store the first sample in a first memory portion of the buffer having a first address that is associated with a first time increment that most closely corresponds to the first designated playback time of the first sample.

In an embodiment, the placement manager is further configured to store samples corresponding to different media channels to different groups of the memory portions. The placement manager may determine the first designated playback time of the first sample based on a timestamp of the data frame and a source sampling period associated with the first sample. In an embodiment, the placement manager may extract from the data frame the source sampling period associated with the first sample. In an embodiment, the placement manager may determine a time span of the data frame and calculate the source sampling period associated with the first sample based on the time span of the data frame and a number of samples in the data frame.

In an embodiment, the placement manager is configured to determine the first address of the first memory portion based on dividing a difference between the first designated playback time of the first sample and the reference time of the buffer by the local sampling period.

In an embodiment, the placement manager can further store a second sample in a second memory portion of the buffer having a second address that is associated with a second time increment that most closely corresponds to a second designated playback time of the second sample, and store, in a third memory portion of the buffer, the first sample, the second sample, or a third sample that is calculated by interpolation based on the first sample and the second sample, where a third address of the third memory buffer is associated with a third time increment between the first time increment and the second time increment.

The frame decoder may extract from the data frame a sequence identifier that indicates a chronological order of the data frame within a media data stream, and the placement manager may perform the storing of the first sample in chronological order as indicated by the sequence identifier.

Aspects of the disclosure provide a method for processing media samples. The method includes receiving a data frame by a device from a source outside the device, extracting from the data frame a first sample, and determining a first designated playback time of the first sample. The method also includes identifying a first memory portion of a buffer of the device and storing the first sample in the first memory portion. The buffer has memory portions that include the first memory portion, and addresses of the memory portions are associated with a reference time and time increments of a local sampling period of the device. The first memory portion has a first address that is associated with a first time increment that most closely corresponds to the first designated playback time of the first sample.

In an embodiment, the method includes determining the first designated playback time of the first sample based on a timestamp of the data frame and a source sampling period associated with the first sample.

In an embodiment, the method includes determining the first address of the first memory portion based on dividing a difference between the first designated playback time of the first sample and the reference time of the buffer by the local sampling period.

Aspects of the disclosure provide a non-transitory computer-readable medium storing instructions that, when executed by a processing circuit, cause the processing circuit to perform a method. The method includes receiving a data frame by a device from a source outside the device, extracting from the data frame a first sample, and determining a first designated playback time of the first sample. The method also includes identifying a first memory portion of a buffer of the device and storing the first sample in the first memory portion. The buffer has memory portions that include the first memory portion, and addresses of the memory portions are associated with a reference time and time increments of a local sampling period of the device. The first memory portion has a first address that is associated with a first time increment that most closely corresponds to the first designated playback time of the first sample.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
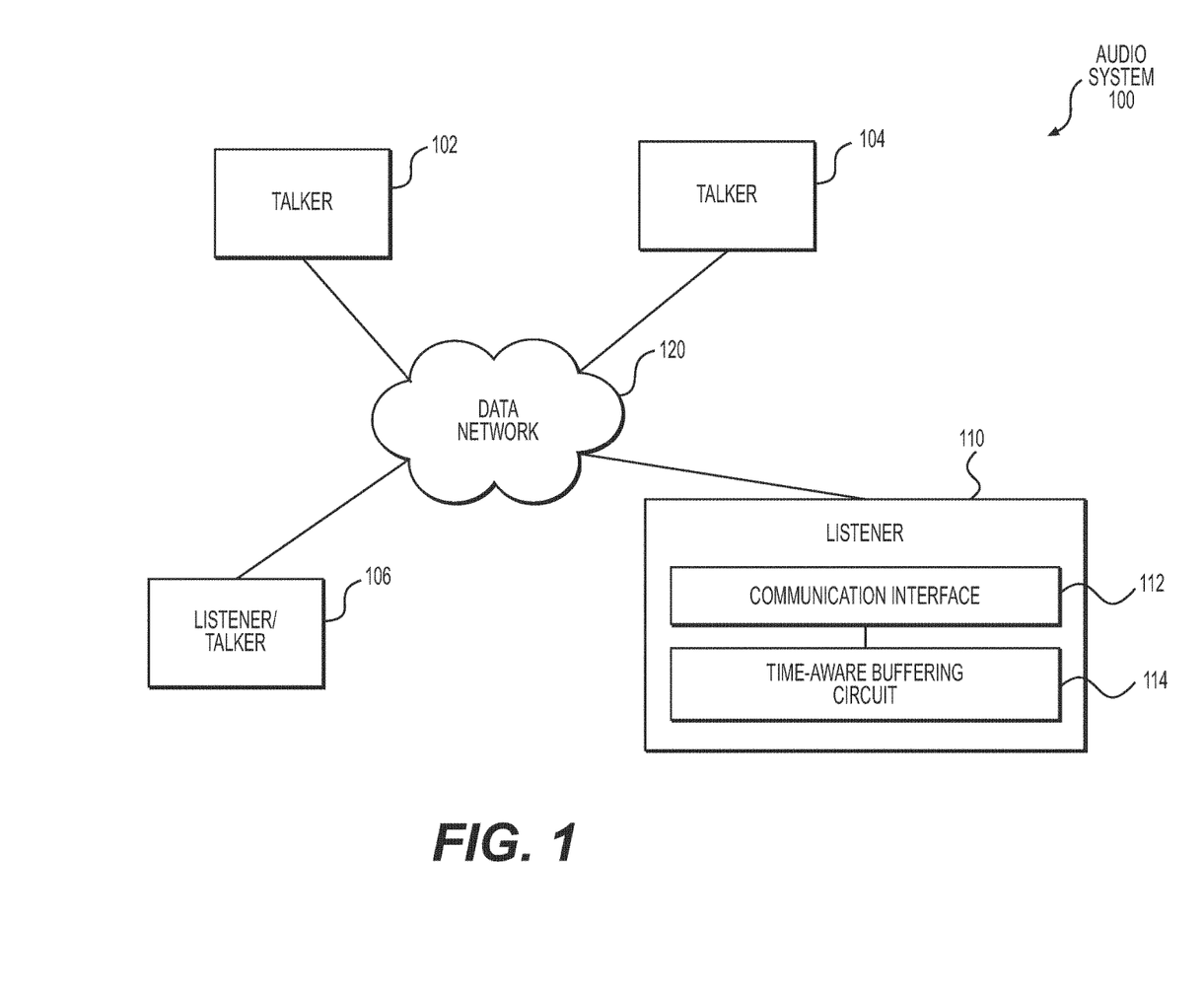
FIG. 1 shows a functional block diagram of an audio system according to an embodiment of the disclosure.

FIG. 1 shows a functional block diagram of an audio system 100 according to an embodiment of the disclosure. The audio system 100 includes a plurality of devices 102, 104, 106, and 110 and a data network 120. The devices 102, 104, 106, and 110 are communicatively coupled with each other through the data network 120. A device that transmits audio data streams to other devices through the data network 120 may be referred to as a source device or a talker, such as devices 102 and 104. A device that receives audio data streams from other devices through the data network 120 may be referred to as a destination device or a listener, such as device 110. Also, a device may function as both a talker device and a listener device, such as device 106.

The device 110 includes a communication interface 112 that is communicatively coupled with the data network 120. The device 110 also includes a time-aware buffering circuit 114 that is configured to store audio samples received by the communication interface 112 from the data network 120.

In operation, the time-aware buffering circuit 114 receives a data frame from a source device, such as device 102, 104, or 106, through the data network 120 and the communication interface 112. The time-aware buffering circuit 114 extracts a sample from the data frame, determines a designated playback time of the sample, and stores the sample in a buffer of the time-aware buffering circuit 114. In some examples, the buffer includes plural memory portions having addresses that are associated with local time points. The local time points can be determined according to a reference time and time increments of a local sampling period of the device 110. The term "local" refers to the device 110 where the time-aware buffering circuit 114 resides. The sample can be stored in a memory portion of the buffer having an address that is associated with a time increment that most closely corresponds to the designated playback time of the sample.

When a source device transmits an audio data stream, each data frame in the audio data stream can carry a sequence identifier that indicates a chronological order of that data frame within the audio data stream. Therefore, a destination device may reconstruct the audio data stream in a proper order even when the data frames are not received according to the proper order. However, when a destination device receives multiple audio streams from different source devices, the sequence identifiers fail to provide sufficient information for synchronizing the audio data streams from different source devices and for matching the sampling rates of the audio data streams.

On the other hand, in accordance with the present disclosure, each received sample is stored in a memory position of a buffer having an address associated with a local time point that most closely corresponds to the designated playback time of the sample. Therefore, synchronizing samples from different source devices and matching sampling rates of the destination device and various source devices can be handled by the time-aware buffering circuit when storing the samples into the buffer of the time-aware buffering circuit.

The devices 102 and 106 may be any type of recording device that converts audio inputs into corresponding audio data streams. The devices 102 and 106 may also be a storage device that generates audio data streams based on information stored in a storage medium readable by the storage device. In some examples, the device 110 may be a playback device that generates audio outputs by speakers based on the received audio data streams. The device 106 may be an audio processing device that receives the audio streams from the devices 102 and 104, generates new audio data streams by processing the received audio streams, and transmits the generated new audio data streams to other device through the data network 120. In some examples, the device 106 may be a combination of one or more of a recording device, a storage device, a playback device, or an audio processing device.

The data network 120 may include a wireless network, a wired network, or a combination thereof. Example wireless network may be implemented according to wireless communication protocols such as Global System for Mobile communication (GSM), Code Division Multiple Access (CDMA), Wideband Code Division Multiple Access (WCDMA), Time Division Synchronous Code Division Multiple Access (TD-SCDMA), Long Term Evolution (LTE), Time Division Long Term Evolution (TD-LTE), Institute of Electrical and Electronics Engineers (IEEE) 802.11 based protocol, IEEE 802.15 based protocol, and the like. Example wired network may be implemented according to wired communication protocols such as ETHERNET, Universal Serial Bus (USB), IEEE-1394, and the like.

Figure 2:
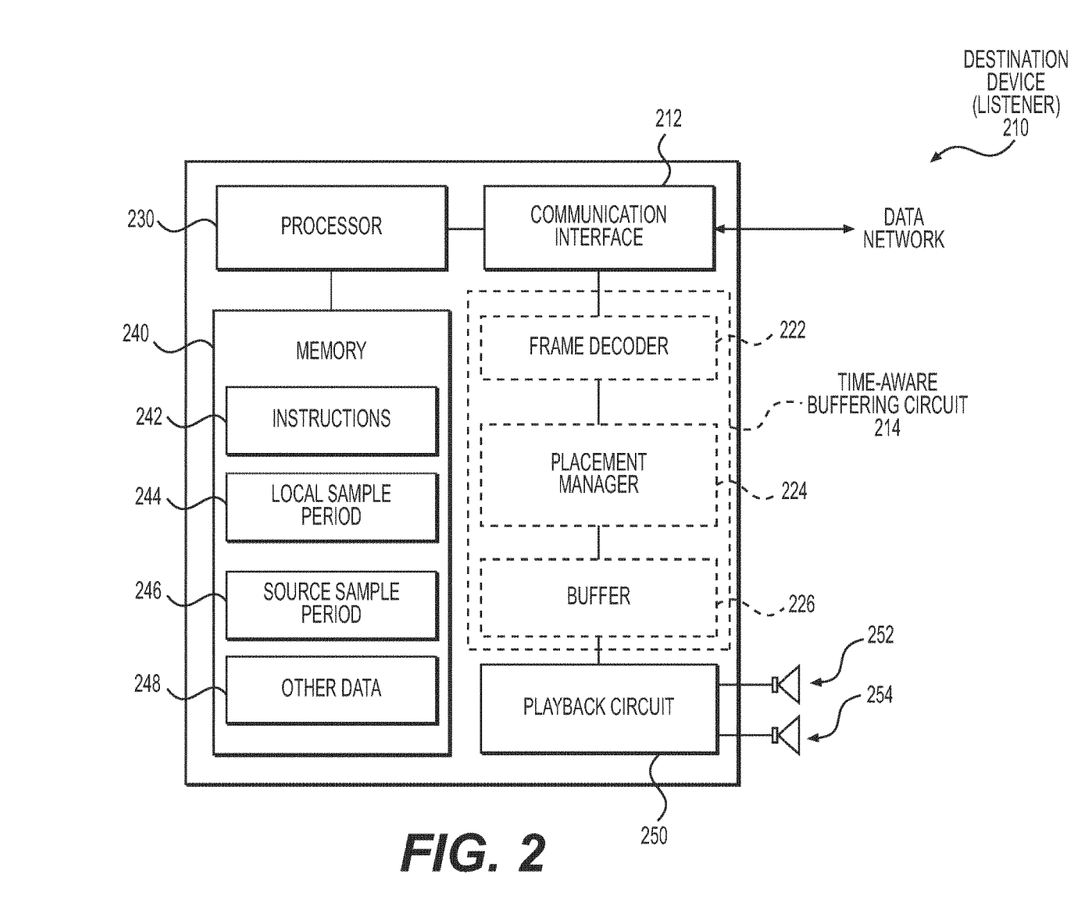
FIG. 2 shows a more detailed functional block diagram of a destination device in an audio system according to an embodiment of the disclosure.

FIG. 2 shows a more detailed functional block diagram of a destination device 210 in an audio system according to an embodiment of the disclosure. The device 210 includes a communication interface 212, a time-aware buffering circuit 214, a processor 230, a memory 240, and a playback circuit 250. The time-aware buffering circuit 214 includes a frame decoder 222, a placement manager 224, and a buffer 226. The playback circuit 250 includes speakers 252 and 254.

The communication interface 212 is communicatively coupled with a data network, such as the data network 120 in FIG. 1. The frame decoder 222 receives a data frame from a source outside the device 210 through the communication interface 212. The frame decoder 222 may extract from the received data frame an audio sample and determine a designated playback time of the sample.

The buffer 226 includes memory portions, and the addresses of the memory portions of the buffer 226 are associated with different time points, which can be determined based on a reference time of the device 210 and time increments of a local sampling period of the device 210. In some examples, the memory portions are divided into groups corresponding to different channels. The placement manager 224 can store the sample in a memory portion of the buffer 226 having an address that is associated with a time increment that most closely corresponds to the designated playback time of the sample.

As shown in FIG. 2, the processor 230 is a processing circuit electrically coupled with the memory 240 and configured to execute program instructions 242 stored in the memory 240 to perform various functions. In some examples, a portion or all of the frame decoder 222, the placement manager 224, and the buffer 226 may be implemented as hardware circuitry, or by the processor 230 executing the program instructions 242, or a combination thereof.

The memory 240 is used to store the program instructions 242, a local sampling period 244 (e.g., the inverse of a local sampling rate), a source sampling period 246 (e.g., the inverse of a source sampling rate), and/or other data, intermediate data, or received or calculated samples 248. In some examples, a portion or the entirety of the buffer 226 may be implemented as a portion of the memory 240.

The playback circuit 250 includes speakers 252 and 254 for providing audio outputs of different audio channels. The playback circuit 250 can fetch buffered audio samples from the buffer 226 and converting the fetched audio samples into audio outputs based on a local sampling rate of the device 210. Of course, the number of speakers as depicted in FIG. 2 is just an example. In fact, in some examples, the destination device 210 may only process and/or forward the buffered samples, and the playback circuit 250 can be omitted.

In operation, the communication interface 212 receives data frames from one or more source devices. Each data frame may include at least one audio sample. In some examples, each data frame includes a timestamp (e.g., time TS) indicating a designated playback time of the first sample of such data frame. The frame decoder 222 receives the data frames from the communication interface 212 and extracts the audio samples carried by the data frames. For each extracted sample, the frame decoder 222 also determines a corresponding designated playback time. For example, when an audio sample is the first sample of the corresponding data frame, the frame decoder 222 may use the timestamp (TS) of the data frame as the designated playback time of the sample. When an audio sample is the k-th sample of the corresponding data frame, where n is a positive integer greater than 2, the frame decoder 222 may determines the designated playback time of the sample as $$TS+(k-1)\cdot \Delta T_{source}$$

where $\Delta T_{source}$ is a source sampling period associated with the samples of the data frame.

Also, the addresses of the memory portions of the buffer 226 are associated with a reference time (T0) and time increments of a local sampling period ($\Delta T$) of the device 210. Therefore, each memory portion has an address associated with a time point that can be expressed as $T0+n\Delta T$, where n is a non-negative integer. The placement manager 224 determines an address of the memory portion for storing an audio sample such that the address is associated with a time increment that most closely corresponds to the designated playback time of the sample. The playback circuit 250 may retrieve audio samples from the buffer 226 in a chronological order for outputting the audio through the speakers 252 and 254.

In some examples, the frame decoder 222 can extract from the received data frames the source sampling period $\Delta T_{source}$ associated with the corresponding samples. In some examples, the frame decoder 222 can calculate the source sampling period $\Delta T_{source}$ by determining a time span of a data frame and dividing the time span by a number of samples in that data frame.

The reference time may be determined based on:

$$T0=T_{Last\_Retrival}+\Delta T$$

where $T_{Last\_Retrival}$ corresponds to the time point of the lastly retrieved sample. Also, the placement manager 224 or the buffer 226 can manage the addresses of the memory portions in a cyclic manner as the reference time T0 updates, such that the memory portion storing a sample that has just been retrieved can be cleared and reused.

The processor 230 includes a single processing core or multiple processing cores. The processor 230 is configured to execute an operating system and various application programs to perform various functions. The memory 240 includes a non-transitory computer readable medium, such as a semiconductor or solid-state memory, a random access memory (RAM), a read-only memory (ROM), a hard disk, an optical disk, or other suitable storage medium. In some embodiments, the memory includes a plurality of non-transitory computer readable mediums listed above. Also, the program instructions 242 stored in the memory 240 may be compliance with one or more programming languages (e.g., Java, Objective-C, and the like), including compiled or interpreted languages, and are deployed as a stand-alone program or as a module, component, a browser-based web application, or other unit suitable for use in a computing environment.

Figure 3:
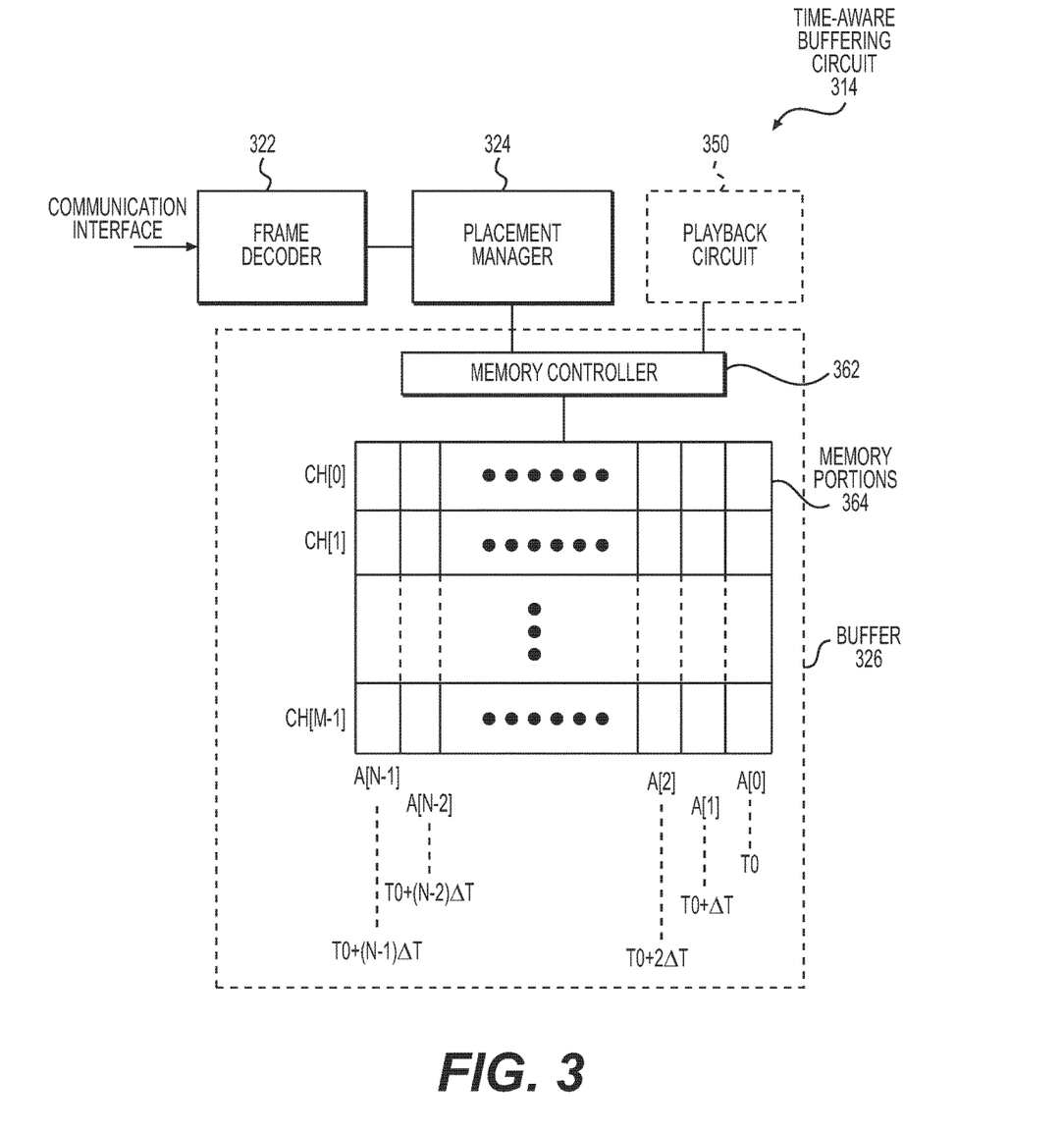
FIG. 3 shows a functional block diagram of a time-aware buffering circuit in a destination device according to an embodiment of the disclosure.

FIG. 3 shows a functional block diagram of a time-aware buffering circuit 314 in a destination device according to an embodiment of the disclosure. The time-aware buffering circuit 314 includes a frame decoder 322, a placement manager 324, and a buffer 326. The playback circuit 350 is not part of the time-aware buffering circuit 314 and is depicted for illustrating the operation of the buffer 326. The buffer 326 includes a memory controller 362 and memory portions 364.

The frame decoder 322 receives data frames from the communication interface and extracts information including audio samples and corresponding timestamps. In some examples, the frame decoder 322 may extract source sampling periods associated with the audios samples from the received data frames. The frame decoder 322 may determine designated playback time of each sample based on the timestamps and the source sampling periods. In some examples, the frame decoder 322 may store or retrieve the source sampling periods to or from a memory, such as memory 240.

The placement manager 324 determines an address of a memory portion for storing an audio sample extracted by the frame decoder 322. In some examples, the placement manager 324 may retrieve the source sampling periods from the frame decoder 322 or from a memory, such as memory 240. The placement manager 324 may send the determined address and the audio sample to the memory controller 362 of the buffer 326. Also, the playback circuit 350 can request the memory controller 362 for retrieval of stored audio samples from the buffer 326.

As shown in FIG. 3, the memory portions 364 are divided into M groups that correspond to M different channels CH[0], CH[1], ..., CH[M−1], where M is a positive integer equal to or greater than one. Also, within each group, there are N memory portions having addresses A[0], A[1], A[2], ... A[N−2], and A[N−1] that are associated with time points T0, T0+ΔT, T0+2ΔT, ... T0+(N−2)ΔT, and T0+(N−1)ΔT, where N is a positive integer equal to or greater than one.

The placement manager 324 may determine the address A[n] of memory portion for storing an audio sample according to:

$$\text{Address Index } n = \text{Cloest Integer of} \left( \frac{\text{Designated Playback Time} - \text{Reference Time } (T0)}{\text{Local Sampling Period } (\Delta T)} \right).$$

The memory portions 364 are managed according to the capability of the device where the buffer 326 is used. In some examples, the number of channels M may range from 1 to 10; and the number of memory portions N for each channel may range from $10^5$ to $10^9$. In some examples, the memory controller 362 can manage the addresses and the association between the addresses and increments of local sampling period (ΔT) in a cyclic manner such that the memory portions that contains audio samples that have been retrieved or expired can be reused for storing incoming audio samples. The memory controller 362 can dynamically adjust the mapping between the logical address A[0] ... A[N−1] and the physically location of the memory portions 364 such that association between the time increments of local sampling period (ΔT) and the addresses can be maintained.

Figure 4:
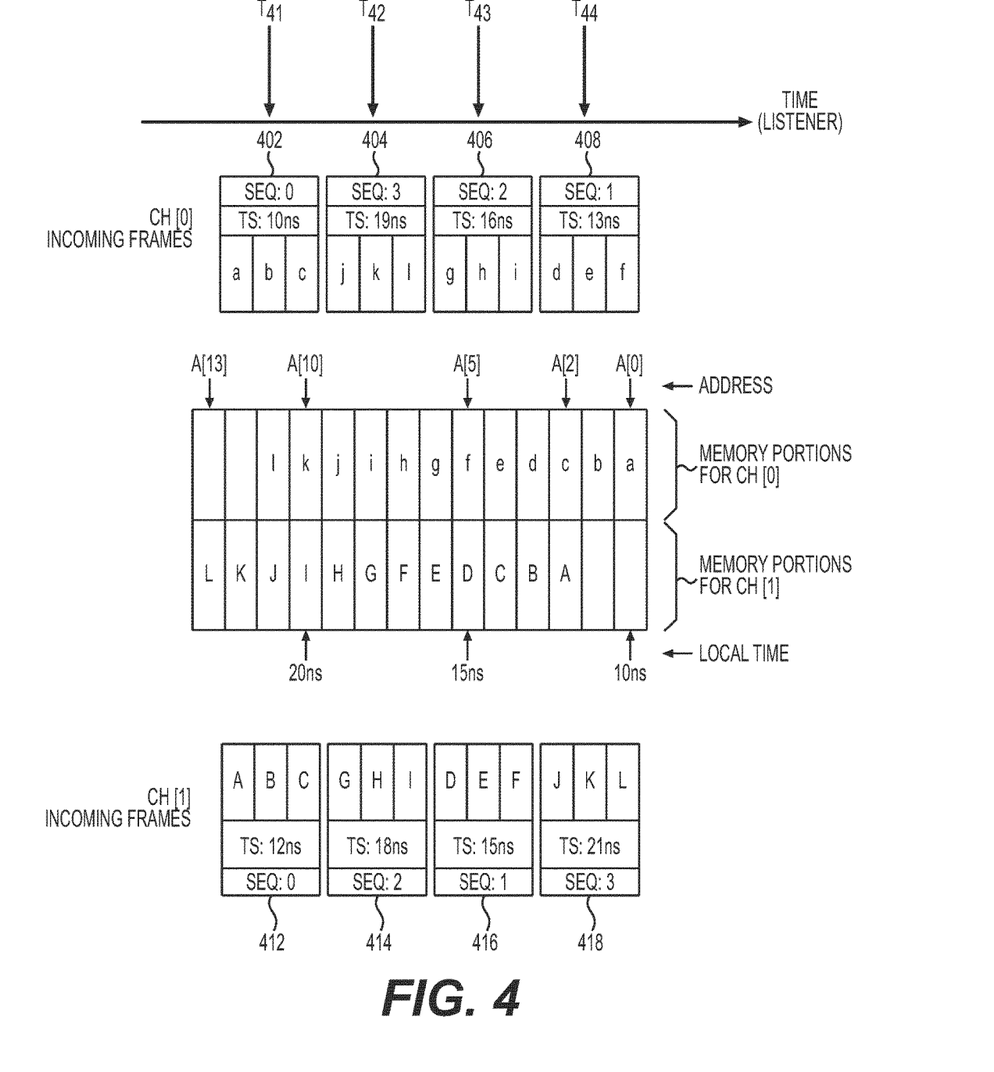
FIG. 4 shows an example of receiving and storing samples that correspond to two channels using a time-aware buffering circuit according to an embodiment of the disclosure.

FIG. 4 shows an example of receiving and storing samples that correspond to two channels CH[0] and CH[1] using a time-aware buffering circuit, such as the time-aware buffering circuit 314 in FIG. 3, according to an embodiment of the disclosure.

As shown in FIG. 4, the memory portions of the time-aware buffering circuit is divided into two groups of memory portions, including one group for channel CH[0] and the other group for channel CH[1]. Each group of memory portions have addresses corresponding to time points of the local time determinable based on the reference time T0 and the local sampling period ΔT. In this example, the reference time T0 is 10 ns. The local sampling period ΔT is 1 ns. Accordingly, for example, address A[0] may be associated with a time point of 10 ns (T0); address A[5] may be associated with a time point of 15 ns (i.e., T0+5ΔT); and address A[10] may be associated with a time point of 20 ns (i.e., T0+10ΔT). Also, the frame decoder 322 may extract from the received data frames or calculated based on the received data frames that the source sampling period associated with channel CH[0] and channel [CH1] is 1 ns.

In operation, the frame decoder 322 receives four data frames 402, 404, 406, and 408 for channel CH[0] at local time of the listener $T_{41}$, $T_{42}$, $T_{43}$, and $T_{44}$, respectively. The frame decoder 322 also receives four data frames 412, 414, 416, and 418 for channel CH[1] at local time of the listener $T_{41}$, $T_{42}$, $T_{43}$, and $T_{44}$, respectively. Each data frame carries three audio samples, a timestamp TS, and a sequence identifier SEQ.

As shown in FIG. 4, the data frame 402 includes three samples a, b, and c; a timestamp TS: 10 ns; and a sequence identifier SEQ: 0. The data frame 404 includes three samples j, k, and l; a timestamp TS: 19 ns; and a sequence identifier SEQ: 3. The data frame 406 includes three samples g, h, and i; a timestamp TS: 16 ns; and a sequence identifier SEQ: 2. The data frame 408 includes three samples d, e, and g; a timestamp TS: 13 ns; and a sequence identifier SEQ: 1.

Therefore, the chronological order of these data frames as indicated by the corresponding sequence identifiers should be data frames 402, 408, 406, and 404. Also, based on the timestamps TS of the data frames and the source sampling period, the frame decoder 322 may determine the designated playback time for samples a, b, c, d, e, f, g, h, i, j, k, and l would be 10, 11, 12, 13, 14, 15, 16, 17, 18, 19, 20, and 21 ns, respectively.

Also, as shown in FIG. 4, the data frame 412 includes three samples A, B, and C; a timestamp TS: 12 ns; and a sequence identifier SEQ: 0. The data frame 414 includes three samples G, H, and I; a timestamp TS: 18 ns; and a sequence identifier SEQ: 2. The data frame 416 includes three samples D, E, and F; a timestamp TS: 15 ns; and a sequence identifier SEQ: 1. The data frame 418 includes three samples J, K, and L; a timestamp TS: 21 ns; and a sequence identifier SEQ: 3. Therefore, the chronological order of these data frames as indicated by the corresponding sequence identifiers should be data frames 412, 416, 414, and 418. Also, based on the timestamps TS of the data frames and the source sampling period, the frame decoder 322 may determine the designated playback time for samples A, B, C, D, E, F, G, H, I, J, K, and L as 12, 13, 14, 15, 16, 17, 18, 19, 20, 21, 22, and 23 ns, respectively.

The placement manager 324 may process the data frames in their chronological orders. For example, for channel CH[0], the placement manager 324 processes the data frames for channel CH[0] in the order of data frames 402, 408, 406, and 404; and the data frames for channel CH[1] in the order of data frames 412, 416, 414, and 418.

For example, sample "a" has a designated playback time at 10 ns. Therefore, the address of the memory portion for sample "a" can be determined as:

$$n = \text{Closest Integer of} \left( \frac{10 \text{ ns} - 10 \text{ ns } (T0)}{1 \text{ ns } (\Delta T)} \right) = 0.$$

Therefore, the sample "a" will be stored at the memory portion having the address A[0] within the group of memory portions for channel CH[0].

Similarly, sample "A" has a designated playback time at 12 ns. Therefore, the address of the memory portion for sample "A" can be determined as:

$$n = \text{Closest Integer of} \left( \frac{12 \text{ ns} - 10 \text{ ns } (T0)}{1 \text{ ns } (\Delta T)} \right) = 2.$$

Therefore, the sample "A" will be stored at the memory portion having the address A[2] within the group of memory portions for channel CH[1].

Accordingly, audio samples a, b, c, d, e, f, g, h, i, j, k, and l can be stored at memory portions for channel CH[0] having addresses A[0] to A[11], which correspond to time points 10, 11, 12, 13, 14, 15, 16, 17, 18, 19, 20, and 21 ns. Also, audio samples A, B, C, D, E, F, G, H, I, J, K, and L can be stored at memory portions for channel CH[1] having addresses A[2] to A[13], which correspond to time points 12, 13, 14, 15, 16, 17, 18, 19, 20, 21, 22, and 23 ns, local time.

As shown in FIG. 4, although the data frames for channel CH[0] and the data frames for channel CH[1] are not properly aligned in the time domain, the audio samples may still be synchronized with the local time of the destination device by storing the samples to corresponding memory portions of the time-aware buffering circuit 314.

Figure 5:
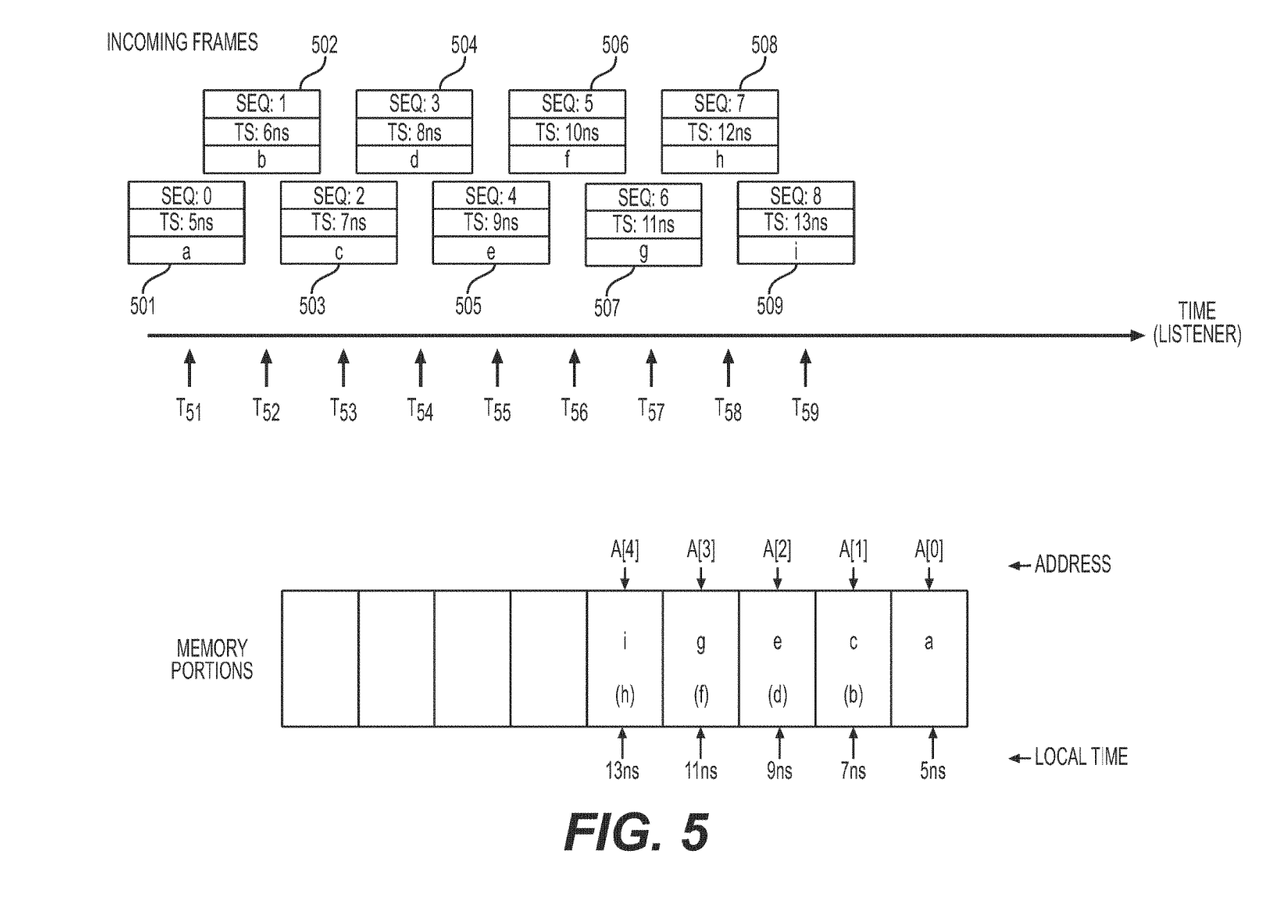
FIG. 5 shows an example of receiving and storing samples using a time-aware buffering circuit, where a source sampling period associated with the samples is less than a local sampling period of a destination device, according to an embodiment of the disclosure.

FIG. 5 shows an example of receiving and storing samples using a time-aware buffering circuit, such as the time-aware buffering circuit 314 in FIG. 3, where a source sampling period associated with the samples is less than a local sampling period of a destination device, according to an embodiment of the disclosure.

As shown in FIG. 5, the memory portions of the time-aware buffering circuit correspond to one channel as an example and have addresses corresponding to time points of the local time. In this example, the reference time T0 is 5 ns. The local sampling period ΔT is 2 ns. Accordingly, address A[0], A[1], A[2], A[3], and A[4] may be associated with time points 5, 7, 9, 11, and 13 ns, respectively. Also, the frame decoder 322 may extract from the received data frames or calculated based on the received data frames that the source sampling period associated with the incoming frames is 1 ns, which is less than the local sampling period.

In operation, the frame decoder 322 receives nine data frames 501-509 at local time $T_{51}$-$T_{59}$, respectively. In this example, each data frame has one audio sample, a timestamp TS, and a sequence identifier SEQ.

As shown in FIG. 5, the data frames 501-509 include sample a, b, c, d, e, f, g, h, and i; timestamps TS: 5, 6, 7, 8, 9, 10, 11, 12, and 13 ns; and sequence identifiers SEQ: 0-8, respectively. Therefore, the chronological order of these data frames as indicated by the corresponding sequence identifiers should be data frames 501, 502, 503, 504, 505, 506, 507, 508, and 509. Also, the frame decoder 322 may determine that the designated playback time for samples a, b, c, d, e, f, g, h, and i would be 5, 6, 7, 8, 9, 10, 11, 12, and 13 ns, respectively.

The placement manager 324 may process the data frames in their chronological orders and determine the addresses of memory portions for storing audio samples in a manner discussed with reference to FIG. 4. For example, sample "a" has a designated playback time at 5 ns. Therefore, the address of the memory portion for sample "a" can be determined as:

$$n = \text{Closest Interger of } \left( \frac{5 \text{ ns} - 5 \text{ ns } (T0)}{2 \text{ ns } (\Delta T)} \right) = 0.$$

Also, sample "b" has a designated playback time at 6 ns. Therefore, the address of the memory portion for sample "b" can be determined as:

$$n = \text{Closest Interger of } \left( \frac{6 \text{ ns} - 5 \text{ ns } (T0)}{2 \text{ ns } (\Delta T)} \right) = 1.$$

Moreover, sample "c" has a designated playback time at 7 ns. Therefore, the address of the memory portion for sample "c" can be determined as:

$$n = \text{Closest Integer of } \left( \frac{7 \text{ ns} - 5 \text{ ns } (T0)}{2 \text{ ns } (\Delta T)} \right) = 1.$$

Similarly, the placement manager 324 may determines the addresses for the samples a, b, c, d, e, f, g, h, and i as A[0], A[1], A[1], A[2], A[2], A[3], A[3], A[4], and A[4], respectively. The received data frames may be processed by the placement manager 324 according to their chronological order. Accordingly, after the sample "a" is stored at the memory portion having the address A[0] and the sample "b" is stored at the memory portion having the address A[1], the sample "c" may be further stored at the memory portion having the address A[1]. As a result, the sample "c" would overwrite the previously stored sample "b". Similarly, samples d, f, and h are stored at the corresponding memory portions but overwritten by samples e, g, and i.

As shown in FIG. 5, despite the mismatch between the source sampling period and the local sampling period, the received audio samples are stored in the time-aware buffering circuit 314 in a manner that matches the local sampling period. Also, the received audio samples can be automatically down-sampled during the buffering process performed by the time-aware buffering circuit 314.

Figure 6:
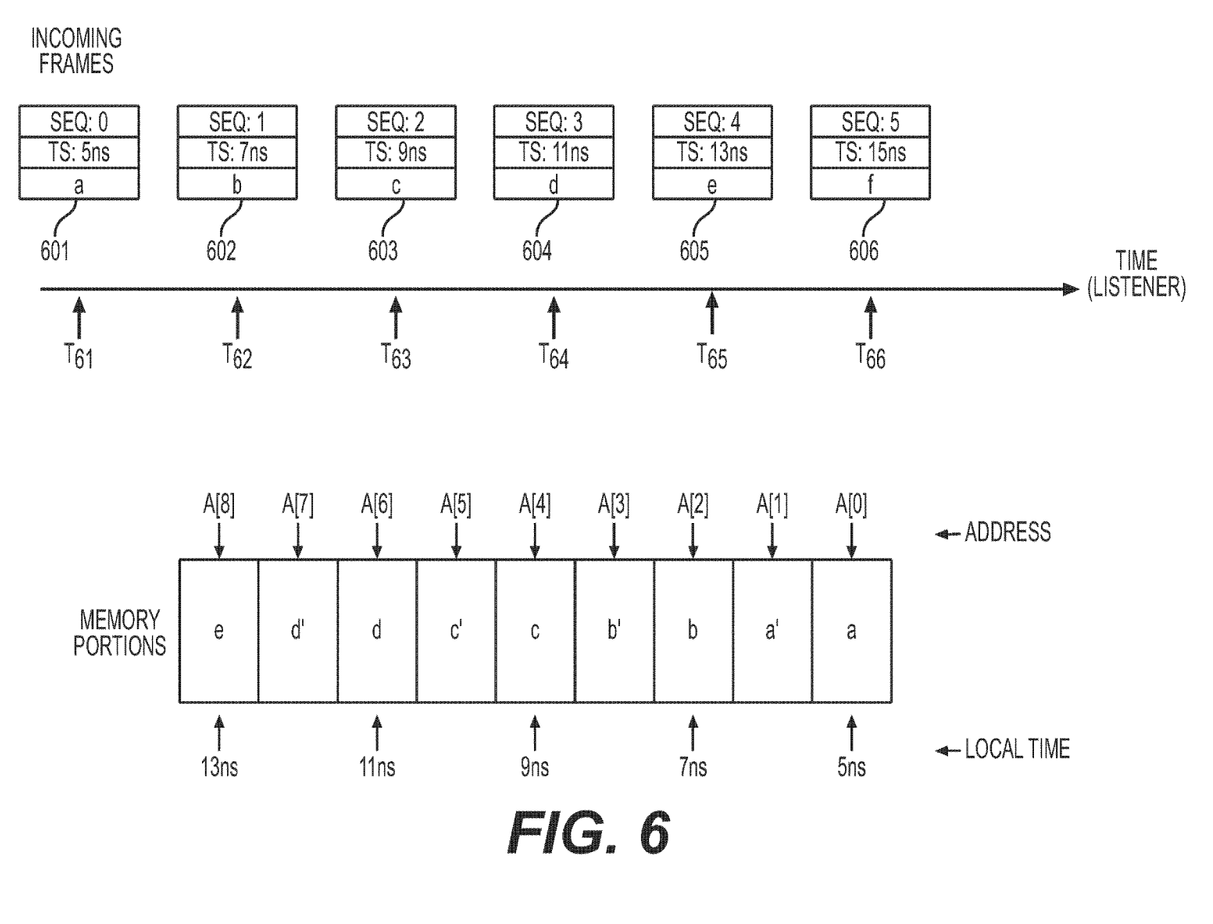
FIG. 6 shows an example of receiving and storing samples using a time-aware buffering circuit, where a source sampling period associated with the samples is greater than a local sampling period of a destination device, according to an embodiment of the disclosure.

FIG. 6 shows an example of receiving and storing samples using a time-aware buffering circuit, such as the time-aware buffering circuit 314 in FIG. 3, where a source sampling period associated with the samples is greater than a local sampling period of a destination device, according to an embodiment of the disclosure.

As shown in FIG. 6, the memory portions of the time-aware buffering circuit correspond to one channel and have addresses corresponding to time points of the local time. In this example, the reference time T0 is 5 ns. The local sampling period ΔT is 1 ns. Accordingly, address A[0], A[1], A[2], A[3], A[4], A[5], A[6], A[7], and A[8] may be associated with time points 5, 6, 7, 8, 9, 10, 11, 12, and 13 ns, respectively. Also, the frame decoder 322 may extract from the received data frames or calculated based on the received data frames that the source sampling period associated with the incoming frames is 2 ns, which is greater than the local sampling period.

In operation, the frame decoder 322 receives six data frames 601-606 at local time $T_{61}$-$T_{66}$, respectively. In this example, each data frame has one audio sample, a timestamp TS, and a sequence identifier SEQ.

As shown in FIG. 6, the data frames 601-606 include samples a, b, c, d, e, and f; timestamps TS: 5, 7, 9, 11, and 13 ns; and sequence identifiers SEQ: 0-5, respectively. Therefore, the chronological order of these data frames as indicated by the corresponding sequence identifiers should be data frames 601, 602, 603, 604, 605, and 606. Also, the frame decoder 322 may determine that the designated playback time for samples a, b, c, d, e, and f would be 5, 7, 9, 11, and 13 ns, respectively.

The placement manager 324 may process the data frames in their chronological orders and determine the addresses of memory portions for storing audio samples in a manner discussed with reference to FIG. 4. For example, sample "a" has a designated playback time at 5 ns. Therefore, the address of the memory portion for sample "a" can be determined as:

$$n = \text{Closest Integer of } \left( \frac{5 \text{ ns} - 5 \text{ ns } (T0)}{1 \text{ ns } (\Delta T)} \right) = 0.$$

Also, sample "b" has a designated playback time at 7 ns. Therefore, the address of the memory portion for sample "b" can be determined as:

$$n = \text{Closest Integer of } \left( \frac{7 \text{ ns} - 5 \text{ ns } (T0)}{1 \text{ ns } (\Delta T)} \right) = 2.$$

Similarly, sample "c" has a designated playback time at 9 ns. Therefore, the address of the memory portion for sample "c" can be determined as:

$$n = \text{Closest Integer of} \left( \frac{9 \text{ ns} - 5 \text{ ns } (T0)}{1 \text{ ns } (\Delta T)} \right) = 4.$$

Therefore, the placement manager 324 may determines the addresses for the samples a, b, c, d, e, and f as A[0], A[2], A[4], A[6], and A[8], respectively. Also, as shown in FIG. 5, the memory portions that have addresses A[1], A[3], A[5], and A[7] thus may not be used for storing the samples a, b, c, d, e, and f. In some examples, the frame decoder 322 or the placement manager 324 may generate additional samples to be filled into the memory portions that do not closely correspond to the designated playback time of the received samples. The additional sample between two received samples may be duplication of any one of the two received samples or calculated by interpolation based the two received samples. For example, the sample a' to be stored in the memory portion having address A[1] may be the same as the sample a, the same as the sample b, or an average of samples a and b. Similarly, additional samples b', c', and d' may be determined based on their corresponding neighboring received samples.

In at least one example, the additional samples a', b', c', and d' are set to a zero value, and the playback circuit 350 may be configured to perform a filtering process to smoothen the waveform of the audio output represented by samples a, a', b, b', c, c', d, d', and e.

As shown in FIG. 6, despite the mismatch between the source sampling period and the local sampling period, the received audio samples are stored in the time-aware buffering circuit 314 in a manner that matches the local sampling period. Also, the received audio samples can be automatically up-sampled during the buffering process performed by the time-aware buffering circuit 314.

Figure 7:
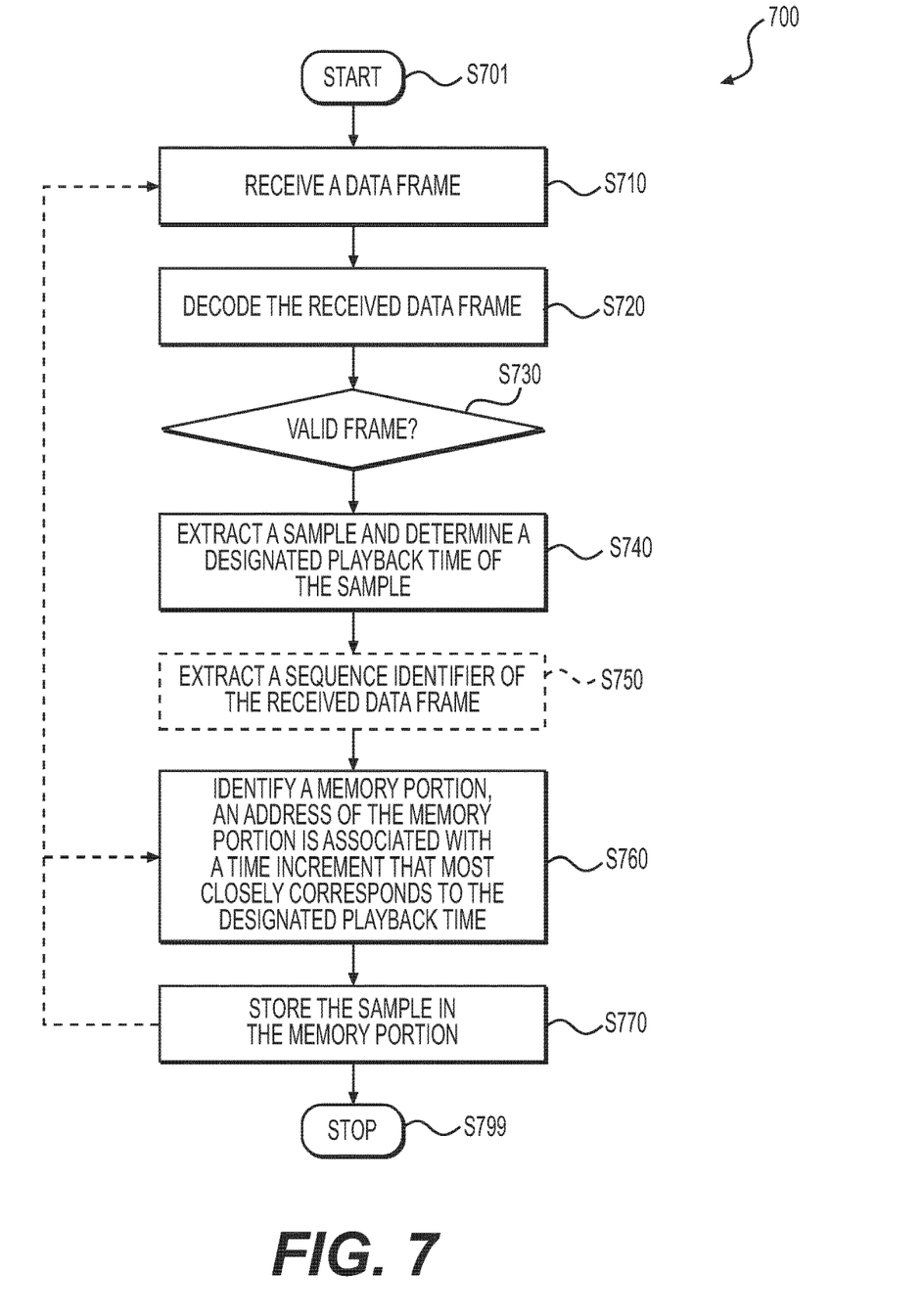
FIG. 7 shows a flow chart outlining a process of receiving and storing samples using a time-aware buffering circuit according to an embodiment of the disclosure.

FIG. 7 shows a flow chart outlining a process 700 of receiving and storing samples using a time-aware buffering circuit, such as the time-aware buffering circuit 314 in FIG. 3, according to an embodiment of the disclosure. It is understood that additional operations may be performed before, during, and/or after the process 700 depicted in FIG. 7. The process 700 starts at S701 and proceeds to S710.

At S710, a data frame is received by a time-aware buffering circuit. For example, the communication interface 212 of a destination device 210 receives a data frame sent by a source device outside the destination device 210, and the frame decoder 322 of the time-aware buffering circuit 314 receives the data frame from the communication interface 212.

At S720, the received data frame is decoded. For example, the frame decoder 322 of the time-aware buffering circuit 314 decodes the received data frame.

At S730, it is determined whether the received data frame is a valid data frame to be processed by the time-aware buffering circuit. When it is that the received data frame is a valid data frame, the process proceeds to S740. However, when it is that the received data frame is not a valid data frame, the process proceeds to S799 and terminates.

For example, the frame decoder 322 of the time-aware buffering circuit 314 determines whether the received data frame is a valid data frame. The frame decoder 322 may check the data format of the data frame, the header of the data frame, or the content of the data frame to determine if the received data frame can be further processed for storing the audio samples therein. In some examples, the frame decoder 322 may determine that the data frame is invalid if the data frame cannot be successfully decoded at S720.

At S740, an audio sample carried by the data frame is extracted and a designated playback time of the audio sample is determined based on the information provided in the data frame. For example, the frame decoder 322 extracts audio samples a, b, and c from data frame 402. Also, the frame decoder 322 also determines the designated playback time for the audio samples a, b, and c (e.g., at 10, 11, and 12 ns local time, respectively) based on the timestamp TS of the data frame 402 and the source sampling period associated with the audio samples a, b, and c.

At S750, a sequence identifier of the received data frame is also extracted such that the time-aware buffering circuit may process the received frame based on the order of the frame in the audio steam it belongs. For example, the frame decoder 322 extracts the sequence identifier SEQ of the data frame 402. In some examples, when the time-aware buffering circuit does not rely upon the sequence identifiers of the data frames or the data frames are not designed to carry the corresponding sequence identifies, S750 may be omitted.

At S760, a memory portion of a buffer of the time-aware buffering circuit for storing the sample is identified. Memory portions of the buffer may be divided into various groups for different channels, and addresses of the memory portions are associated with a reference time and time increments of a local sampling period of the destination device. The memory portion may be identified by a channel of the sample and an address of the memory portion such that the identified memory portion having an address that is associated with a time increment that most closely corresponds to the designated playback time of the sample.

For example, the addresses of memory portions for storing corresponding audio samples may be determined as described with references to FIGS. 3-6.

At S770, the sample is stored in the memory portion identified at S760.

After S770, the process proceeds to S799 and terminates. In some examples, after S770, the process may proceed to S760 to store other samples of the same data frame, or proceed to S710 to process other samples.

In some examples, the data frames may be implemented according to a Hardware Audio Translation (HAT) block based on Ethernet Audio Video Bridging (AVB) protocol or the IEEE 1722 standard, or the modification thereof. The timestamps carried by a data frame may correspond to the Audio Video Transport Protocol (AVTP) timestamp defined in the IEEE 1722 standard or the like. Other data formats or protocols are within the scope of contemplated embodiments.

Of course, the audio system, audio samples, and audio data streams in the present disclosure are illustrated as non-limiting examples. The time-aware buffering circuit and method illustrated in the present disclosure can be applicable to an entertainment system for receiving and storing media samples, including audio samples, image samples, video frames, or a combination thereof, or the like. Also, the number of channels, the number of data frames, and the number of samples within each data frame are illustrated as non-limiting examples.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A device for processing media samples, the device comprising:
 a frame decoder configured to receive a data frame from a source outside the device, extract from the data frame a first sample, and determine a first designated playback time of the first sample;
 a buffer having memory portions, addresses of the memory portions being associated with a reference time and time increments of a local sampling period of the device; and
 a placement manager configured to store the first sample in a first memory portion of the buffer having a first address that is associated with a first time increment that most closely corresponds to the first designated playback time of the first sample,
 wherein the placement manager is configured to determine the first address of the first memory portion based on dividing a difference between the first designated playback time of the first sample and the reference time of the buffer by the local sampling period.

2. The device of claim 1, wherein
 the placement manager is further configured to store samples corresponding to different media channels to different groups of the memory portions.

3. The device of claim 1, wherein the placement manager is further configured to determine the first designated playback time of the first sample based on a timestamp of the data frame and a source sampling period associated with the first sample.

4. The device of claim 1, wherein the placement manager is further configured to:
 store a second sample in a second memory portion of the buffer having a second address that is associated with a second time increment that most closely corresponds to a second designated playback time of the second sample; and
 store, in a third memory portion of the buffer, the first sample, the second sample, or a third sample that is calculated by interpolation based on the first sample and the second sample, where a third address of the third memory buffer is associated with a third time increment between the first time increment and the second time increment.

5. The device of claim 1, wherein the frame decoder is further configured to extract from the data frame a source sampling period associated with the first sample.

6. The device of claim 1, wherein the frame decoder is further configured to:
 determine a time span of the data frame; and
 calculate a source sampling period associated with the first sample based on the time span of the data frame and a number of samples in the data frame.

7. The device of claim 1, wherein
 the frame decoder is further configured to extract from the data frame a sequence identifier that indicates a chronological order of the data frame within a media data stream, and
 the placement manager is further configured to perform the storing of the first sample in chronological order as indicated by the sequence identifier.

8. A method for processing media samples, the method comprising:
 receiving a data frame by a device from a source outside the device;
 extracting from the data frame a first sample, and determining a first designated playback time of the first sample;
 identifying a first memory portion of a buffer of the device, the buffer having memory portions that include the first memory portion, addresses of the memory portions being associated with a reference time and time increments of a local sampling period of the device, and the first memory portion having a first address that is associated with a first time increment that most closely corresponds to the first designated playback time of the first sample; and
 storing the first sample in the first memory portion,
 wherein the identifying the first memory portion includes determining the first address of the first memory portion based on dividing a difference between the first designated playback time of the first sample and the reference time of the buffer by the local sampling period.

9. The method of claim 8, further comprising storing samples corresponding to different media channels to different groups of the memory portions.

10. The method of claim 8, further comprising determining the first designated playback time of the first sample based on a timestamp of the data frame and a source sampling period associated with the first sample.

11. The method of claim 8, further comprising:
 storing a second sample in a second memory portion of the buffer having a second address that is associated with a second time increment that most closely corresponds to a second designated playback time of the second sample; and
 storing, in a third memory portion of the buffer, the first sample, the second sample, or a third sample that is calculated by interpolation based on the first sample and the second sample, where a third address of the third memory buffer is associated with a third time increment between the first time increment and the second time increment.

12. The method of claim 8, further comprising:
 extracting from the data frame a sequence identifier that indicates a chronological order of the data frame within a media data stream; and
 performing the storing of the first sample in accordance with the chronological order as indicated by the sequence identifier.

13. A non-transitory computer-readable medium storing instructions that, when executed by a processing circuit of a device, cause the processing circuit to perform a method comprising:
 receiving a data frame from a source outside the device;
 extracting from the data frame a first sample, and determining a first designated playback time of the first sample;
 identifying a first memory portion of a buffer of the device, the buffer having memory portions that includes the first memory portion, addresses of the memory portions being associated with a reference time and time increments of a local sampling period of the device, and the first memory portion having a first address that is associated with a first time increment that most closely corresponds to the first designated playback time of the first sample; and
 storing the first sample in the first memory portion, wherein the identifying the first memory portion includes determining the first address of the first memory portion based on dividing a difference between the first designated playback time of the first sample and the reference time of the buffer by the local sampling period.

14. The non-transitory computer-readable medium of claim 13, wherein the method further comprises storing samples corresponding to different media channels to different groups of the memory portions.

15. The non-transitory computer-readable medium of claim 13, wherein the method further comprises determining the first designated playback time of the first sample based on a timestamp of the data frame and a source sampling period associated with the first sample.

16. The non-transitory computer-readable medium of claim 13, wherein the method further comprises:
   storing a second sample in a second memory portion of the buffer having a second address that is associated with a second time increment that most closely corresponds to a second designated playback time of the second sample; and
   storing, in a third memory portion of the buffer, the first sample, the second sample, or a third sample that is calculated by interpolation based on the first sample and the second sample, where a third address of the third memory buffer is associated with a third time increment between the first time increment and the second time increment.

17. The non-transitory computer-readable medium of claim 13, wherein the method further comprises:
   extracting from the data frame a sequence identifier that indicates a chronological order of the data frame within a media data stream; and
   performing the storing of the first sample in accordance with the chronological order as indicated by the sequence identifier.

* * * * *